United States Patent [19]

Pedain et al.

[11] Patent Number: 4,801,675
[45] Date of Patent: Jan. 31, 1989

[54] PROCESS FOR THE PREPARATION OF PREPOLYMERS CONTAINING ISOCYANATE GROUPS, THE PREPOLYMERS OBTAINABLE BY THIS PROCESS AND THEIR USE AS BINDERS IN ONE-COMPONENT LACQUERS

[75] Inventors: Josef Pedain, Cologne; Michael Sonntag, Odenthal; Klaus König, Odenthal, all of Fed. Rep. of Germany

[73] Assignee: Bayer Aktiengesellschaft, Bayerwerk, Fed. Rep. of Germany

[21] Appl. No.: 60,782

[22] Filed: Jun. 10, 1987

[30] Foreign Application Priority Data

Jun. 28, 1986 [DE] Fed. Rep. of Germany ....... 3621706

[51] Int. Cl.$^4$ ...................... C08G 18/28; C08G 18/77; C08G 18/70
[52] U.S. Cl. ..................................... 528/73; 528/67; 528/65; 528/66
[58] Field of Search ....................... 528/66, 73, 65, 67

[56] References Cited

U.S. PATENT DOCUMENTS

| | | | |
|---|---|---|---|
| 3,748,315 | 7/1973 | Sidney et al. | 528/66 |
| 4,359,541 | 11/1982 | Patton, Jr. et al. | 528/73 |
| 4,382,114 | 5/1983 | Höhlein et al. | 428/423.1 |
| 4,518,740 | 5/1985 | Disteldorf et al. | 524/783 |
| 4,560,494 | 12/1985 | Druetzler | 528/73 |
| 4,604,418 | 8/1986 | Shindo et al. | 524/296 |
| 4,657,796 | 4/1987 | Musil et al. | 528/66 |
| 4,707,502 | 11/1987 | Rasshofer et al. | 528/73 |

FOREIGN PATENT DOCUMENTS 966338 8/1961 United Kingdom .
1412432 11/1975 United Kingdom .

OTHER PUBLICATIONS

H. Kittel in Lehrbuch der Lacke und Beschichtungen, Publishers, W. A. Colomb, Berlin-Oberschwandorf, 1973, vol. 1, Part 2, p. 574 (Not Translated).

Primary Examiner—Harold D. Anderson
Assistant Examiner—Dennis R. Daley
Attorney, Agent, or Firm—Gene Harsh; Joseph C. Gil; Thomas W. Roy

[57] ABSTRACT

The invention is directed to a process for the preparation of prepolymers containing free isocyanate groups and having an isocyanate content of 1 to 16% by weight by the reaction of
(a) a polyisocyanate component with
(b) a polyhydroxyl component based on (i) at least one polyester polyol having a hydroxyl functionality (average) of about 1.8 to 5 and a hydroxyl number (average) of from 15 to 300 or (ii) mixtures of polyester polyols of the type mentioned under (i) with up to about 10% by weight, based on the weight of the mixture, of (cyclo)alkane polyols having a hydroxyl number above about 300 and optionally containing ester groups at an NCO/OH equivalent ratio above 2:1, characterized in that the compounds used as component (a) contain triisocyanato-isocyanurates having aliphatically or cycloaliphatically bound isocyanate groups. The present invention also relates to the prepolymers with free isocyanate groups obtainable by this process and their use as binders for moisture hardening one-component lacquers.

18 Claims, No Drawings

PROCESS FOR THE PREPARATION OF PREPOLYMERS CONTAINING ISOCYANATE GROUPS, THE PREPOLYMERS OBTAINABLE BY THIS PROCESS AND THEIR USE AS BINDERS IN ONE-COMPONENT LACQUERS

BACKGROUND OF THE INVENTION

1. Field of the Invention

This invention relates to new prepolymers containing free isocyanate groups obtained by the reaction of excess quantities of polyisocyanates containing isocyanurate groups with polyester polyols, to the prepolymers obtainable by this process and to their use as binders in moisture hardening one-component lacquers.

2. Description of the Prior Art

Moisture hardening polyurethane lacquers based on aliphatic polyisocyanates, in particular on isocyanate prepolymers containing aliphatically bound isocyanate groups are already known and have been described, for example, by H. Kittel in "Lehrbuch der Lacke und Beschichtungen", publishers W. A. Colomb, Berlin-Oberschwandorf 1973, Volume 1, Part 2, page 574. Polyisocyanates with a biuret structure prepared from hexamethylene diisocyanate have gained a position of particular commercial importance for the preparation of such binders.

The previously known moisture hardening one-component PUR lacquers have various advantages over two-component PUR lacquers, e.g., simple, uncomplicated methods of working up, great hardness and rapid onset of drying by the formation of high molecular weight polyurethane ureas. However, the moisture hardening one-component lacquers of the state of the art based on aliphatic isocyanates also have certain disadvantages which manifest themselves in the lack of long-term stability of the lacquers. Pigmented lacquers based on the isocyanate prepolymers previously known, for example, frequently do not satisfy the requirements for resistance to yellowing on exposure to light and for resistance to weathering. The insufficient resistance to weathering leads to loss of gloss and to chalking of the coatings produced from the lacquers.

It was an object of the present invention to provide new prepolymers containing isocyanate groups as binders for moisture hardening one-component lacquers which would be superior to the known prepolymers in the properties mentioned above.

This problem was solved by means of the process according to the invention described below.

SUMMARY OF THE INVENTION

The invention is directed to a process for the preparation of prepolymers containing free isocyanate groups and having an isocyanate content of 1 to 16% by weight by the reaction of (a) a polyisocyanate component with
(b) a polyhydroxyl component based on (i) at least one polyester polyol having a hydroxyl functionality (average) of about 1.8 to 5 and a hydroxyl number (average) of about 15 to 300 or (ii) mixtures of polyester polyols of the type mentioned under (i) with up to about 10% by weight, based on the weight of the mixture, of (cyclo)alkane polyols having a hydroxyl number above about 300 and optionally containing ester groups at an NCO/OH equivalent ratio above 2:1, characterized in that the compounds used as component (a) are (i) triisocyanato-isocyanurates corresponding to the formula

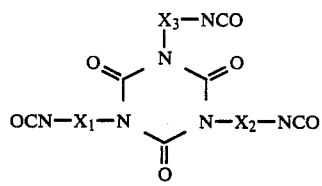

(ii) mixtures of the triisocyanato-isocyanurates indicated under (i) with their higher homologues containing more than one isocyanurate ring or (iii) mixtures of the polyisocyanates indicated under (i) and (ii) with up to about 60 isocyanate equivalent percent, based on the total quantity of component (a), of organic polyisocyanates free from isocyanurate groups, wherein $X_1$, $X_2$ and $X_3$ in the above formula represent identical or different groups which are difunctional, aliphatic or cycloaliphatic hydrocarbon groups having a molecular weight of 84 to 206.

The present invention also relates to the prepolymers with free isocyanate groups obtainable by this process and their use as binders for moisture hardening one-component lacquers.

DETAILED DESCRIPTION OF THE INVENTION

Polyisocyanate component a) to be used in the process according to the invention is based on polyisocyanates containing isocyanurate groups or mixtures of such polyisocyanates with polyisocyanates which are free from isocyanurate groups.

The polyisocyanates containing isocyanurate groups may be both (i) triisocyanato-monoisocyanurates and (ii) mixtures thereof with their higher homologues.

The triisocyanate-monoisocyanurates correspond to the above general formula in which the symbols $X_1$, $X_2$ and $X_3$ have the meanings indicated above, but preferably represent identical or different hydrocarbon groups linking the isocyanate groups of 1,6-diisocyanatohexane and/or of 1-isocyanato-3,3,5-trimethyl-5-isocyanatomethylcyclohexane. The polyisocyanates containing isocyanurate groups used in the process according to the invention are thus preferably the trimerization products of these two diisocyanates or of mixtures thereof although other polyisocyanates with isocyanurate groups conforming to the above definition of $X_1$, $X_2$ and $X_3$ are in principle also suitable, for example, those which have been prepared from isocyanates based entirely or partly on aliphatic or cycloaliphatic diisocyanates such as 1,8-diisocyanato-octane, 1,11-diisocyanato-undecane, 4,4-diisocyanato-cyclohexane, 4,4'-diisocyanatodicyclohexylmethane or diisocyanates according to DE-OS No. 3,402,623 (U.S. Pat. No. 4,613,685). The polyisocyanates containing isocyanurate groups may be prepared, for example, according to DE-P No. 2,616,416, EP-OS No. 3,765, EP-OS No. 10,589, EP-OS No. 47,452, U.S. Pat. No. 4,288,586, U.S. Pat. No. 4,412,073, U.S. Pat. No. 4,324,879, DE-OS No. 3,219,608, EP-OS No. 0,155,559, EP-OS No. 0,017,998, DE-OS No. 2,806,731, EP-OS No. 0,082,987, EP-OS No. 0,100,129 or EP-OS No. 0,047,452.

Whether the polyisocyanates containing isocyanurate groups consist for the most part of pure triisocyanato-monoisocyanurate (i) or of mixtures thereof (ii) with their higher homologues depends primarily upon the nature of the starting diisocyanate used and on the degree of trimerization. Thus, for example, if the two isocyanate groups of the diisocyanate used differ greatly in their reactivity, as, for example in the aliphatic-cycloaliphatic diisocyanates according to DE-OS No. 3,402,823, then virtually pure triisocyanato-monoisocyanurates can be prepared from them even if their degree of trimerization is in the region of 50% (DE-OS No. 3,507,719). If the isocyanate groups of the diisocyanates used as starting material are identical only or slightly different in their reactivity, the formation of higher homologues in the trimerization reaction can be kept within narrow limits by premature termination of the trimerization reaction (followed by distillative removal of unreacted diisocyanate excess). In general, however, the proportion of higher homologues present in the polyisocyanates containing isocyanurate groups is not decisive in determining whether these polyisocyanates are suitable for the process according to the invention. Polyisocyanates with isocyanurate groups suitable as starting components (ii) for the process according to the invention may contain up to about 80% by weight of higher homologues containing more than one isocyanurate group. The polyisocyanates (i) and (ii) containing isocyanurate groups generally have an isocyanate content of about 10 to 30% by weight, preferably about 15 to 25% by weight.

The polyisocyanate mixtures (iii) which may also be used as polyisocyanate component a) in the process according to the invention are mixtures of polyisocyanates containing isocyanurate groups (i) or (ii) with up to about 60, preferably up to about 40 and most preferably up to about 20 isocyanate equivalent percent, based on the total quantity of component (iii), of polyisocyanates which are free from isocyanurate groups, in particular diisocyanates such as 1,6-diisocyanatohexane, IPDI or in particular uretdione diisocyanates containing aliphatically and/or cycloaliphatically bound isocyanate groups and corresponding to the formula

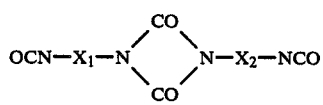

wherein $X_1$ and $X_2$ have the meaning or preferred meaning indicated above. Such uretdione diisocyanates are frequently formed in minor quantities (about 0.1 to 5, in particular about 0.3 to 3 isocyanate equivalents percent) in addition to the polyisocyanates containing isocyanurate groups in the trimerization reaction of aliphatic and/or cycloaliphatic diisocyanates of the type exemplified above. In addition, the isocyanate mixtures (iii) may also contain polyisocyanates free from isocyanurate groups in the form of the well-known "lacquer polyisocyanates" such as tris-(6-isocyanato- hexyl)-biuret and its higher homologues or polyisocyanates containing urethane groups such as those obtained, for example, from the reaction of excess quantities of IPDI with polyhydric alcohols such as trimethylolpropane.

Component (a) preferably contains at least about isocyanate equivalent percent of triisocyanato-monoisocyanurates corresponding to the above general formula.

Component (b) is based on (i) polyester polyols or mixtures of various polyester polyols having a hydroxyl functionality (average) of about 1.8 to 5, preferably 2 to 3, and a hydroxyl number (average) of about 15 to 300, preferably about 40 to 150, or (ii) mixtures of such polyester polyols with up to about 10% by weight, based on the weight of the mixture, of (cyclo)alkane polyols having a hydroxyl number above about 300 and optionally containing ester groups.

The polyester polyols (i) are esterification products of di- and/or polycarboxylic acids with excess quantities of (cyclo)alkane polyols known from polyurethane chemistry. Suitable acids for use in preparing the esterification products include succinic acid, adipic acid, suberic acid, azelaic acid, sebacic acid, phthalic acid, isophthalic acid, terephthalic acid, tetrahydrophthalic acid, trimellitic acid, pyromellitic acid, hexahydrophthalic acid, hexahydroterephthalic acid and/or 1-methyl-cyclohexane-2,5-dicarboxylic acid or intramolecular anhydrides of the acids are capable of intramolecular anhydride formation. Suitable (cyclo)alkane polyols include (cyclo)alkane diols such as ethylene glycol, propane-1,2-diol, propane-1,3-diol, diethylene glycol, butane-1,4-diol, hexane-1,6-diol, octane-1,8-diol, neopentyl glycol, 2-methyl-propane-1,3-diol, 1,4- and 1,3-bis-(hydroxymethyl)-cyclohexane, trimethylolpropane, glycerol, pentaerythritol, 1,2-, 1,3- or 1,4-cyclohexane diol, 2,2-bis-(4-hydroxycyclo- hexyl)-propane and/or 2-methyl-2,4-bis-(4-hydroxycyclo- hexyl)-pentane. In the preparation of polyester polyols from the starting materials exemplified above, a proportion of monocarboxylic acids such as benzoic acid or hexane carboxylic acids or of monohydric alcohols such as n-butanol or n-hexanol may also be included provided the conditions mentioned above concerning the hydroxyl functionality are observed. The inclusion of such monofunctional starting components is, however, by no means preferred.

The polyester polyols (i) also include the polylactones known from polyurethane chemistry, e.g. the polymers of ε-caprolactone started on polyhydric alcohols of the type exemplified.

In addition, the polyester polyols (i) include the hydroxyl-containing polycarbonates known from polyurethane chemistry such as those obtained, for example, from the reaction of the diols exemplified above with phosgene or diarylcarbonates, in particular diphenylcarbonate.

However, particularly preferred polyester polyols (i) include those which contain at least about 10% by weight, preferably about 15 to 50% by weight, of 1,2-, 1,3- and/or 1,4-difunctional cycloaliphatic groups corresponding to the formula

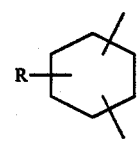

incorporated in the molecule. In this formula, R represents hydrogen or an alkyl group with 1 to 4 carbon atoms, preferably hydrogen or a methyl group, most preferably hydrogen.

These cyclohexylene groups may be incorporated by using those dicarboxylic acids or diols of the type exemplified above which contain cyclohexylene groups for the preparation of the above-mentioned esterification products of polycarboxylic acids with polyhydric alcohols, or the polylactones or polycarbonates.

Instead of using polyester polyols (i), mixtures (ii) of such polyester polyols with (cyclo)alkane polyols having a hydroxyl number above about 300 and optionally containing ester groups may be used as polyhydroxyl component (b) in the process according to the invention. When such mixtures are used, the proportion of the las-mentioned polyols in the mixture should be at the most 10% by weight, based on the total weight of component (ii). Examples of such components for the mixture include the above-mentioned simple (cyclo)alkane polyols as well as low molecular weight polyols containing ester groups such as adipic acid-bis-(2-hydroxyethyl)-ester.

The use of polyester polyols (i) is preferred over the use of the above-mentioned mixture (ii).

The process according to the invention, i.e. the reaction of component (a) with component (b) may be carried out without solvents although it is preferred to use solvents of the kind commonly used for producing polyurethane lacquers. Preferred solvents include aromatic hydrocarbons such as toluene, xylene and higher alkylbenzene mixtures; aliphatic hydrocarbons such as cyclohexane; and polar solvents such as ethyl acetate, n-butyl acetate and i-butyl acetate, ethyl glycol acetate, methoxy propylene glycol acetate, methyl ethyl ketone, methyl-i-amyl ketone, cyclohexanone or mixtures of the above solvents.

For the preparation of the prepolymers containing isocyanate groups, polyisocyanate component (a) or solutions thereof are generally introduced into the reaction vessel under an inert gas such as nitrogen and mixed with polyol component (b) or solutions thereof and reacted under an inert gas at about 20° to 160° C., preferably about 60° to 120° C., until the isocyanate content has fallen to the calculated level or slightly below and remains constant. The quantitative proportions of the reactants are chosen so that the NCO/OH equivalent ratio is greater than 2:1, preferably greater than about 4:1 and most preferably about 7:1 to 15:1.

Based on the solids content, the resulting products of the process have an isocyanate content of about 1 to 16% by weight, preferably about 4 to 12% by weight.

If solvents of the type exemplified above have already been used for the preparation of the isocyanate prepolymers, binder solutions for moisture hardening one-component lacquers are obtained directly and may be used for their particular purpose after the addition of the usual auxiliary agents and additives. When isocyanate prepolymers are prepared without solvents of the type exemplified above, the reaction product obtained may be dissolved in such a solvent to form a binder solution.

As may be seen from the figures given above concerning the NCO/OH equivalent ratio and the isocyanate content, the products obtained from the process according to the invention may be either true isocyanate prepolymers, i.e. free from monomers, or mixtures of isocyanate prepolymers with excess unreacted starting polyisocyanates (a), also known as "isocyanate semi-prepolymers." The term "prepolymers containing isocyanate groups" used in the context of this invention includes both "true" isocyanate prepolymers and isocyanate semi-prepolymers.

The binder solutions according to the invention may be mixed with the usual additives used in polyurethane lacquer technology. These include catalysts for the isocyanate/water reaction such as dibutyl tin dilaurate: levelling agents such as acrylate polymers, e.g. Modaflow from Monsanto, fillers such as talcum or heavy spar and the usual inorganic or organic pigments.

The one-component lacquers based on the products of the process according to the invention are suitable for all high quality top coat lacquers which are required to be long lasting. The following applications are mentioned as examples: wood lacquering (clear lacquers for parquet flooring, lacquers for painting boats, furniture lacquers); impregnating agents for brickwork, concrete, asbestos cement and stone flooring; and synthetic lacquers containing lightfast and color stable pigments or the like. Moisture hardening one-component lacquers based on the products according to the invention are particularly suitable for decorative weather-resistant and color stable lacquers used outdoors which are required to have very good gloss retention and resistance to chalking as well as high resistance to solvents, abrasion and chemicals. Impregnation with clear lacquers based on the products according to the invention protect the coated surfaces against the action of UV light, moisture, oils, fuels and corrosive chemicals. The products of the process according to the invention are also suitable for use as binders for corrosion protective lacquers or pigmented or unpigmented top coat lacquers for heavy goods vehicles such as buses or rail coaches.

The invention is further illustrated, but is not intended to be limited by the following examples in which all parts and percentages are by weight unless otherwise specified.

EXAMPLES

The following starting components are used in the examples.

Polyisocyanate I:

A thin layered polyisocyanate containing isocyanurate groups based on 1,6-hexane diisocyanate, prepared according to Example 1 of EP-A No. 10,589 (U.S. Pat. No. 4,324,879) and having an isocyanate content of 21.4%, a viscosity (25° C.) of 2100 mPas, a monomeric 1,6-diisocyanatohexane content of 0.1% and a triisocyanato-monoisocyanurate content of about 49%.

Polyester I:

Starting materials:

| | |
|---|---|
| 3.48 kg trimethylolpropane | 26.0 mol |
| 25.83 kg 1,4-bis-(hydroxymethyl)-cyclohexane | 179.4 mol |
| 2.1 kg ethylene glycol | 33.8 mol |
| 15.14 kg neopentyl glycol | 145.6 mol |
| 49.25 kg phthalic acid anhydride | 332.8 mol |
| 3.0 kg SnCl$_2$.2 H$_2$O as catalyst. | |

Preparation of the polyester:

The starting products (without catalyst) were weighed into a 100 l tank and melted by heating to a temperature of 140° C. under nitrogen. After one hour at this temperature, water was distilled off and at the same time the temperature was raised to 200° C. in the course of 5 to 6 hours.

After a further 2 hours, the catalyst was added and the vacuum phase was begun. The final vacuum of 15 mbar was reached after about 6 hours. Condensation was continued until the acid number was below 3 (about 12 hours).

The resulting polyester was a solid resin which had the following properties:
Acid number: <3
OH number: 48.2
Iodine color number: 1
Proportion of cyclohexylene segments ($C_6H_{10}$): 15.85%.

Polyester II:
Starting materials:
9.6 mol hexahydrophthalic acid anhydride
1.9 mol trimethylolpropane
4.8 mol hexane-1,6-diol
4.3 mol perhydrobisphenol A The polyester was prepared by the method employed for polyester I.
Characteristic data:
Acid number: 8
OH number: 63
Iodine color value: 1
Content in cyclohexylene segments ($C_6H_{10}$): 47.25%.

Polyester III:
Starting materials:
3.00 mol neopentyl glycol
0.75 mol ethane diol
3.75 mol 1,4-bis-(hydroxymethyl)cyclohexane
6.5 mol phthalic acid anhydride.

Polyester III was prepared by a method analogous to that employed for polyester I.
Characteristic data:
Acid number: 2.9
OH number: 59.6
Iodine color value: 1
Content in cyclohexylene segments ($C_6H_{10}$): 17.64%.

EXAMPLE 1

Reaction mixture
700 g polyisocyanate I
429 g of a 70% solution in Solvesso 100* and 2-methoxypropyl-acetate (4:1) of polyester I
240 g Solvesso 100*
60 g 2-methoxypropyl-acetate

*Solvesso 100 is a commercially available mixture of alkyl aromatic compounds in the boiling point range of 161° to 179° C.

Method:
The polyisocyanate was introduced into the reaction vessel at room temperature and homogeneously mixed with the polyester solution. The mixture was then diluted with the solvents and heated to 100° C. and stirred at this temperature until the isocyanate content of the solution was 9.6% (about 5 to 6 hours). After cooling, the product in the form of a 70% solution had a viscosity of 1600 mPas (25° C.).

Further characteristic data of the product:
NCO/OH = 13.7
NCO content of the solution: 9.6%
Monomeric diisocyanate content of the solution: below 0.01%
Color value (DIN 53 409): <20.

EXAMPLE 2

The procedure was as indicated in Example 1 and the following compounds were reacted together:
1,400 g polyisocyanate I
986 g polyester III
1,617 g Solvesso 100

The resulting product had the data given below. 60% solution in Solvesso 100
Viscosity: 600 mPas (25° C.)
NCO/OH: 7.2
NCO content of the solution: 6.3%
Color value (DIN 53 409): <20
Monomeric diisocyanate content: <0.01%.

EXAMPLE 3

The procedure was the same as in Example 1 and the following components were reacted:
2,000 g polyisocyanate I
889 g polyester II
963 g xylene
963 g butyl acetate.

Characteristic data of the reaction product:
NCO/OH = 10
60% solution in xylene/butyl acetate (1:1)
NCO content of the solution: 7.2
Viscosity of the solution: 800 mPas (25° C.).

EXMAPLE 4

This examples illustrates the preparation of clear lacquer films obtained from the isocyanate prepolymers of Examples 1, 2 and 3 and their properties.

The solution of the given prepolymer was diluted with a mixture of xylene and 2-methoxypropylacetate (4:1) to a working concentration of 40% and 0.1% of dibutyl tin dilaurate was added as a catalyst. Clear lacquer films were applied by means of a coating roller system (width of gap 0.12 mm) to clean, degreased glass plates and steel plates. The plates were stored at ambient temperature (20° to 25° C.) at a relative humidity of 60%. Glossy, colorless clear lacquer films were obtained. The lacquer films attained their final properties after about 7 days. The tests were then carried out. The results of the measurements are summarized in the Table.

|  | Example 1 | Example 2 | Example 3 |
|---|---|---|---|
| Sand drying (DIN 53 150) | 4 h | 5 h | 4 h |
| Pendulum hardness König (DIN 53 157) | 236 | 219 | 227 |
| Solvent attack* after 7 days' storage |  |  |  |
| Action (1 min) of Ethyl glycol acetate | 0 | 0 | 0 |
| Ethyl acetate | 0 | 0 | 0 |
| Acetone | 0 | 1 | 0 |
| Super grade petrol | 0 | 0 | 0 |
| Abrasion according to DIN 53 109 (load 10 N, 1000 revolutions) | 16 | 18 | 11 |
| Erichsen cupping (DIN 53 156) (Layer thickness of films: 45–55 μm) | 10.0 | 10.0 | 9.9 |

*The solvent attack was measured in 5 stages: 0, 1, 2, 3, 4.
0 = film completely unchanged
4 = film dissolves.

The results of the lacquer film tests showed that the binders according to the invention harden to form very high quality polyurethane layers which are hard but also tough and elastic.

The drying process may be accelerated if necessary by the addition of a higher proportion of catalyst.

EXAMPLE 5

In this example, the isocyanate prepolymers according to the invention were used for the preparation of pigmented lacquers and the durability of the films obtained from the lacquers was examined. To simplify the assessment, only white lacquers were prepared. For this purpose, pigments and additives were added to the 70% or 60% solutions of the isocyanate prepolymers from Examples 1, 2 and 3 and the solutions were adjusted to a lower concentration by the addition of a solvent mixture of xylene/butyl acetate (3:1) so that the outflow time (DIN 53 211, 4 mm nozzle) was 40 seconds. The pigment was titrated on a three-roller mixer.

The compositions of the triturates are entered in the following Table.

| Components | Parts by weight | | |
|---|---|---|---|
| Polyisocyanate solution | | | |
| from Example 1 | 50 | — | — |
| from Example 2 | — | 58.3 | — |
| from Example 3 | — | — | 58.3 |
| Solvent mixture: | | | |
| Xylene/butyl acetate (3:1) | 20.5 | 60.2 | 63.4 |
| Silicone oil as levelling agent (10% in methoxypropylene glycol acetate) | 0.4 | 0.4 | 0.4 |
| Catalyst (dibutyl tin dilaurate) | 0.1 | 0.1 | 0.1 |
| Titanium dioxide (rutile type) | 22 | 22 | 22 |
| Agent for preventing settling of the pigment* | 0.2 | 0.2 | 0.2 |

*highly disperse silica (Aerosil 300 of Degussa).

The lacquer compositions shown in the Table were completely stable for at least 3 months when stored in closed containers with careful exclusion of moisture.

Samples of the lacquers ready for spraying were sprayed on mild steel plates at a thickness of 0.5 mm and the samples were stored for 14 days at about 23° C. and a relative humidity of 60%.

The impact strength (ASTM-D 2794), rocking hardness of König (DIN 53 157) and bonding strength in crosscut (DIN 53 151) of the lacquer films were then tested. The test results are summarized in the Table below.

| Example | Impact strength (kg × cm) | Hardness (sec) | Bond strength (Gt 0-4) |
|---|---|---|---|
| 1 | 60 | 150 | 0 |
| 2 | 50 | 130 | 1 |
| 3 | 35 | 170 | 0 |

To test the durability of the lacquers prepared from the isocyanate prepolymers according to the invention under permanent exposure, the steel plates were subjected to a weathering test in Florida. The plates were laid out at an angle of 45° and the change of gloss with time was assessed. The gloss was assessed according to the Gardner hardness scale at 60° C. (DIN 67 530) at intervals of 3 months over a period of 18 months. The results were summarized in the Table below.

| Lacquer sample from | Gloss reading after | | | | | | |
|---|---|---|---|---|---|---|---|
| | 0 | 3 | 6 | 9 | 12 | 15 | 18 months |
| Example 1 | 98 | 90 | 90 | 85 | 80 | 75 | 70 |
| Example 2 | 97 | 93 | 90 | 85 | 78 | 75 | 72 |
| Example 3 | 98 | 93 | 93 | 89 | 85 | 80 | 75 |

The lacquers on the weathered plates were mechanically tested again after they had been cleaned. Only a very slight, virtually negligible deterioration in their properties could be detected.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a prepolymer containing free isocyanate groups and having an isocyanate content of 1 to 16% by weight which comprises reacting at an NCO/OH equivalent ratio above 2:1
   (a) a polyisocyanate component comprising
      (i) a triisocyanato-isocyanurate corresponding to the formula

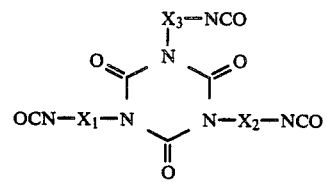

(ii) a mixture of the triisocyanato-isocyanurate mentioned under (i) with its higher homologues containing more than one isocyanurate ring, or
      (iii) a mixture of the polyisocyanate mentioned under (i) or (ii) with up to 60 isocyanate equivalent percent, based on the total quantity of component (a) of an organic polyisocyanate which is free from isocyanurate groups,
   wherein $X_1$, $X_2$ and $X_3$ are identical or different and represent difunctional, aliphatic or cycloaliphatic hydrocarbon groups having a molecular weight of 84 to 206 with
   (b) a polyhydroxyl component comprising
      (i) at least one polyester polyol having a hydroxyl functionality (average) of about 1.8 to 5 and a hydroxyl number (average) of about 15 to 300, or
      (ii) a mixture of the polyester polyol mentioned under (i) with up to about 10% by weight, based on the weight of the mixture, of a (cyclo)alkane polyol having a hydroxyl number above about 300 and optionally containing ester groups.

2. The process of claim 1 wherein component (a) comprises at least about 40 NCO equivalent percent of the triisocyanato-isocyanurate set forth in component (a)(i).

3. The process of claim 1 wherein (b)(i) contains about 15 to 50% by weight of an optionally alkyl-substituted cyclohexylene group corresponding to the formula

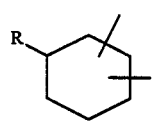

chemically incorporated into said at least one polyester polyol wherein R represents hydrogen or an alkyl group having 1 to 4 carbon atoms.

4. The process of claim 3 wherein component (a) comprises at least about 40 NCO equivalent percent of the triisocyanato-isocyanurate set forth in component (a)(i).

5. A prepolymer containing free isocyanate groups and having an isocyanate content of 1 to 16% by weight which is prepared by a process which comprises reacting at an NCO/OH equivalent ratio above 2:1
(a) a polyisocyanate component comprising
  (i) a triisocyanato-isocyanurate corresponding to the formula

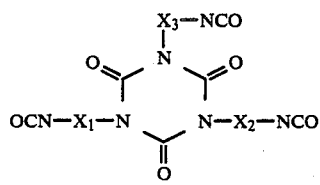

(ii) a mixture of the triisocyanato-isocyanurate mentioned under (i) with its higher homologues containing more than one isocyanurate ring, or
  (iii) a mixture of the polyisocyanate mentioned under (i) or (ii) with up to 60 isocyanate equivalent percent, based on the total quantity of component (a), of an organic polyisocyanate which is free from isocyanurate groups,
  wherein $X_1$, $X_2$ and $X_3$ are identical or different and represent difunctional, aliphatic or cycloaliphatic hydrocarbon groups having a molecular weight of 84 to 206 with
(b) a polyhydroxyl component comprising
  (i) at least one polyester polyol having a hydroxyl functionality (average) of about 1.8 to 5 and a hydroxyl number (average) of about 15 to 300, or
  (ii) a mixture of the polyester polyol mentioned under (i) with up to about 10% by weight, based on the weight of the mixture, of a (cyclo)alkane polyol having a hydroxyl number above about 300 and optionally containing ester groups.

6. The prepolymer of claim 5 wherein component (a) comprises at least about 40 NCO equivalent percen of the triisocyanato-isocyanurate set forth in component (a)(i).

7. The prepolymer of claim 5 wherein (b)(i) contains about 15 to 50% by weight of an optionally alkyl-substituted cyclohexylene group corresponding to the formula

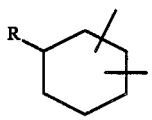

chemically incorporated into said at least one polyester polyol wherein R represents hydrogen or an alkyl group with 1 to 4 carbon atoms.

8. The prepolymer of claim 7 wherein component (a) comprises at least about 40 NCO equivalent percent of the triisocyanato-isocyanurate set forth in component (a)(i).

9. A one-component, moisture-curing lacquer which comprises the prepolymer of claim 5.

10. A process for the preparation of a prepolymer containing free isocyanate groups and having an isocyanate content of 1 to 16% by weight which comprises reacting at an NCO/OH equivalent ratio above 4:1
(a) a polyisocyanate component comprising
  (i) a triisocyanato-isocyanurate corresponding to the formula

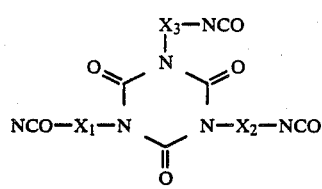

(ii) a mixture of the triisocyanato-isocyanurate mentioned under (i) with its higher homologues containing more than one isocyanurate ring, or
  (iii) a mixture of the polyisocyanate mentioned under (i) or (ii) with up to 60 isocyanate equivalent percent, based on the total quantity of component (a), of an orgaic polyisocyanate which is free from isocyanurate groups,
  wherein $X_1$, $X_2$ and $X_3$ are identical or different and represent difunctional, aliphatic or cycloaliphatic hydrocarbon groups having a molecular weight of 84 to 206 with
(b) a polyhydroxyl component comprising
  (i) at least one polyester polyol having a hydroxyl functionality (average) of about 1.8 to 5 and a hydroxyl number (average) of about 15 to 300, or
  (ii) a mixture of the polyester polyol mentioned under (i) with up to about 10% by weight, based on the weight of the mixture, of a (cyclo)alkane polyol having a hydroxyl number above about 300 and optionally containing ester groups.

11. The process of claim 10 wherein component (a) comprises at least about 40 NCO equivalent percent of the triisocyanato-isocyanurate set forth in component (a)(i).

12. The process of claim 10 wherein (b)(i) contains about 15 to 50% by weight of an optionally alkyl-substituted cyclohexylene group corresponding to the formula

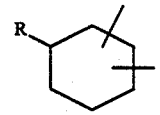

chemically incorporated into said at least one polyester polyol wherein R represents hydrogen or an alkyl group having 1 to 4 carbon atoms.

13. The process of claim 12 wherein component (a) comprises at least about 40 NCO equivalent percent of the triisocyanato-isocyanaturate set forth in component (a)(i).

14. A prepolymer containing free isocyanate groups and having an isocyanate content of 1 to 16% by weight which is prepared by a process which comprises reacting at an NCO/OH equivalent ratio above 4:1
(a) a polyisocyanate component comprising
  (i) a triisocyanato-isocyanurate corresponding to the formula

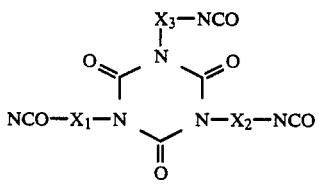

(ii) a mixture of the triisocyanato-isocyanurate mentioned under (i) with its higher homologues containing more than one isocyanurate ring, or (iii) a mixture of the polyisocyanate mentioned under (i) or (ii) with up to 60 isocyanate equivalent percent, based on the total quantity of component (a), of an organic polyisocyanate which is free from isocyanurate groups, wherein $X_1$, $X_2$ and $X_3$ are identical or different and represent difunctional, aliphatic or cycloaliphatic hydrocarbon groups having a molecular weight of 84 to 206 with (b) a polyhydroxyl component comprising
  (i) at least one polyester polyol having a hydroxyl functionality (average) of about 1.8 to 5 and a hydroxyl number (average) of about 15 to 300, or
  (ii) a mixture of the polyester polyol mentioned under (i) with up to about 10% by weight, based on the weight of the mixture, of a (cyclo)alkane polyol having a hydroxyl number above about 300 and optionally containing ester groups.

15. The prepolymer of claim 14 wherein component (a) comprises at least about 40 NCO equivalent percent of the triisocyanato-isocyanurate set forth in component (a)(i).

16. The prepolymer of claim 14 wherein (b)(i) contains about 15 to 50% by weight of an optionally alkyl-substituted cyclohexylene group corresponding to the formula

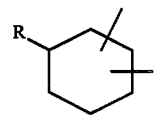

chemically incorporated into said at least one polyester polyol wherein R represents hydrogen or an alkyl group with 1 to 4 carbon atoms.

17. The prepolymer of claim 16 wherein component (a) comprises at least about 40 NCO equivalent percent of the triisocyanato-isocyanurate set forth in component (a)(i).

18. A one-component, moisture-curing lacquer which comprises the prepolymer of claim 14.

* * * * *